United States Patent [19]

Nomoto et al.

[11] Patent Number: 4,688,125
[45] Date of Patent: Aug. 18, 1987

[54] ARRANGEMENT OF PUSH-BUTTON CONTROLLED FLOPPY DISC DEVICE

[76] Inventors: Reishi Nomoto, No.2758-4, Aza-Nishi-Kanamaru, Negoya, Tsukui-machi, Tsuki-gun, Kanagawa-ken; Yoshiaki Ozaki, No.400-1, Nishiterakata-machi, Hachioji-shi, Tokyo, both of Japan

[21] Appl. No.: 708,332

[22] Filed: Mar. 5, 1985

[30] Foreign Application Priority Data

Nov. 13, 1984 [JP] Japan ............................ 59-171063[U]

[51] Int. Cl.⁴ ..................... G11B 17/02; G11B 17/035
[52] U.S. Cl. ........................................ 360/99; 360/97; 360/132
[58] Field of Search ........................... 360/97, 99, 132

[56] References Cited

U.S. PATENT DOCUMENTS

| 4,205,355 | 5/1980 | Hamanaka et al. | 300/99 |
| 4,208,681 | 6/1980 | Hatchett | 360/97 |
| 4,509,086 | 4/1985 | Hickethier et al. | 360/99 |
| 4,546,396 | 10/1985 | Schatteman | 360/97 X |
| 4,562,498 | 12/1985 | Shibata | 360/97 |

Primary Examiner—Stuart N. Hecker
Assistant Examiner—Alyssa H. Bowler

[57] ABSTRACT

A floppy disc device according to the invention is provided with guide walls for sliding an eject button and holding plates for holding a circuit base plate, the eject button being functioned when a disc cassette is released from its recording and/or reproducing position, and is discharged outside of the device.

1 Claim, 3 Drawing Figures

FIG_1
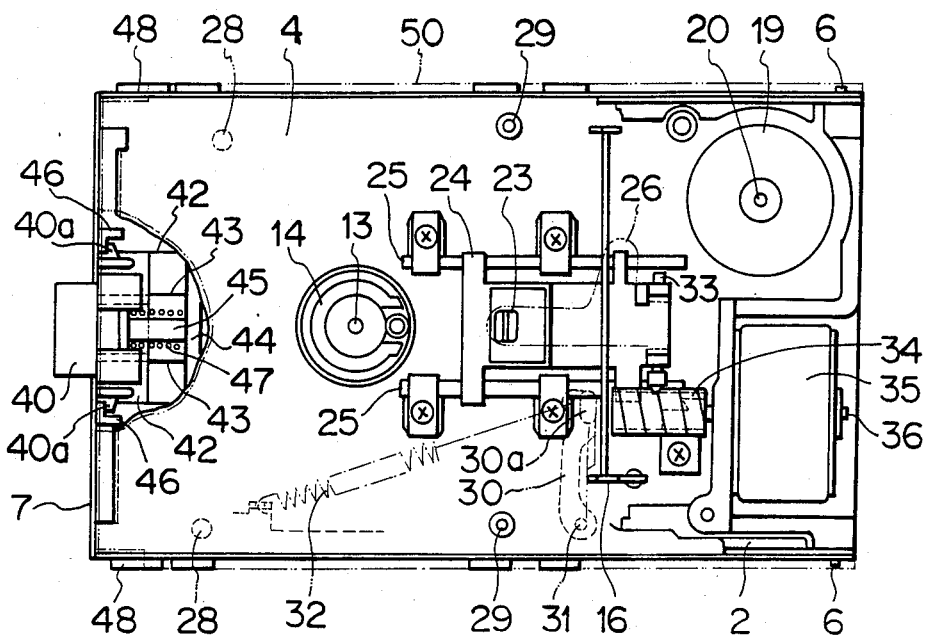
FIG_2
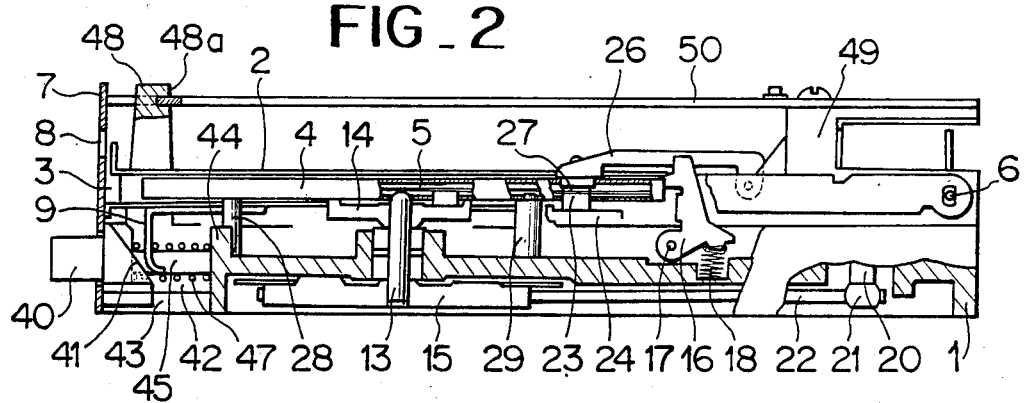
FIG_3
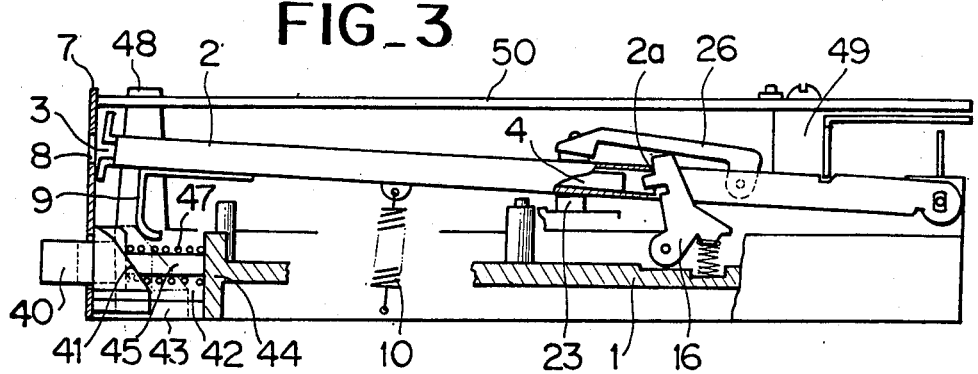

ARRANGEMENT OF PUSH-BUTTON CONTROLLED FLOPPY DISC DEVICE

FIELD OF THE INVENTION

This invention relates to a floppy disc device, and more particularly to a push-button controlled floppy disc drive wherein a bezel provided at a front part of the drive does not perform any operational function.

BACKGROUND OF THE INVENTION

Recently, a magnetic record and reproduction device, that is, a floppy disc device has been rapidly distributed, which utilizes a flexible magnetic disc as a magnetic memory medium which is an external memory device of office automation machinery such as a personal computer or a word processor.

In conventional floppy disc devices, a bezel to be attached to a front face of the device is provided with not only an opening for a disc cassette housing a floppy disc in a case but also with guide walls for sliding an eject button and hold plates for holding a circuit base plate to function the device, said eject button being functioned when a disc cassette held by a disc carrier is released from a recording and/or reproducing condition, and discharged outside of the device.

However, if the bezel is functioned as mentioned above, it is impossible to omit the bezel in order to save production cost or for reducing the number of processes. The bezel is often an obstacle to incorporating the floppy disc device into the personal computer or the word processor.

In view of the above mentioned circumstances of the prior art, the object of the present invention is to provide a floppy disc device of the so-called non-function bezel type wherein the bezel does not perform any work.

SUMMARY OF THE INVENTION

A floppy disc device according to the invention is provided with guide walls for sliding an eject button and holding plates for holding a circuit base plate, the eject button being functioned when a disc cassette is released from a condition of recording and/or reproducing data, and is discharged outside of the device.

BRIEF DESCRIPTION OF THE DRAWING

FIG. 1 is a plan view of an embodiment of the invention; and

FIGS. 2 and 3 are respectively cross sectional side views of the embodiment of FIG. 11.

THE MOST PREFERRED EMBODIMENT OF THE INVENTION

The present invention will be explained in reference to FIGS. 1 to 3.

The numeral 1 designates a base plate of the disc drive mechanism, to a front end of which a bezel 7 is secured, the bezel being of so-called non-function type consisting of a flat frame provided only with an opening 8 for a disc cassette 4 and an opening for ejection button 40. The base plate 1 is, at its rear side, provided with a carrier disc 2. The rear part of carrier disc 2 is rotatable around the bearing pin 6, and detachably holds a disc cassette 4 insertable into the disc 2 through an opening 3 thereof. Further, the carrier disc 2 is caught by a tension spring 10, which is held to the base plate with its one end, and biased toward the surface of the base, and is provided with a cross member 9 under the opening 3.

The numeral 16 designates a carrier support which is rotatably supported on a shaft 17 and biased in a counterclockwise direction by a spring 18. The carrier support 16 engages a terminal portion 2a of an upper plate of the carrier disc 2 in order to control the rotation of the carrier disc 2 away from the base plate 1.

The numeral 13 designates a spindle which is rotatably mounted in the base 1 via a bearing. The spindle 13 is, at its upper part, fixed with a spindle hub 14 for chucking and rotating a magnetic disc 5, and is fixed with a pulley 15 at its lower part.

The numeral 19 indicates a motor for driving the magnetic disc 5. A pulley 21 secured on the rotation shaft 20 of the motor 19 and a pulley 15 secured on the spindle 13 are connected by a belt 22.

The numeral 28 (28) designates a holding pin provided in the base plate 1 for holding the lower surface of the disc cassette 4. The numeral 29 (29) denotes a positioning pin placed in an engaging hole in the lower surface of the disc cassette 4 for positioning and holding the disc cassette together with the holding pin 28.

The numeral 30 designates a shutter releasing lever which is pivoted on a shaft 31 provided in a guide groove for charging the disc cassette 4 of the carrier disc 2, and which is provided, at its end, with a projection 30a of an oval shape for releasing the shutter and discharging the disc cassette. The shutter releasing lever 30 is caught by a tension spring 32 with its one end and the other end being supported by the carrier disc 2, and is effected with the counterclockwise rotation (in the charging opening of the disc cassette).

The numeral 23 denotes a magnetic head which contacts the magnetic disc 5 for performing the recording and/or reproduction of the data, and which is secured on a carriage 24 slidably mounted on two guide shafts 25 horizontal and parallel with respect to the surface of the base plate 1.

The numeral 27 designates a pad provided at an end portion of a pad arm 26 and facing to the magnetic head 23. The pad arm 26 is biased with the counterclockwise rotation (in the direction of the magnetic head) on a shaft provided in the carriage 24, and it keeps a desirable contact between the magnetic head 23 and the magnetic disc 4 by pressure of the pad 27 while performing the recording and/or the reproduction of the data on the magnetic disc 5.

The numeral 33 designates a follower shaft provided in the carriage 24, which engages, at its end portion, in a groove defined in a lead screw 34 mounted on a rotation shaft 36 of a stepping motor 35. The magnetic head 23 is reciprocated radial direction of the magnetic disc 5 by the driving of the stepping motor 35.

The numeral 40 denotes an eject button, an oblique portion 41 of which is to engage the cross member 9 projected on the carrier disc 2 and which rotates the carrier disc 2 against the force of the tension spring 10.

On the base plate 1, there is, at the front and center part thereof, provided an attaching structure for the eject button 40. The attaching structure comprises right and left guide walls 42, 43 for sliding the eject button 40, a rear wall 44 and a front stopper wall 46 having an opening for receiving a projecting front part of the button, the rear wall 44 being provided with a spring 47 and a guide rod 45 extending horizontally.

The eject button 40 is provided at the sides thereof with abutment hooks 40a of an elastic deformable material. The eject button 40 is attached into the above mentioned attaching structure by deforming said hooks 40a laterally inwardly and mounting the rear part of the eject button on the guide rod 45 whereby the operating front part of the button projects outwards.

The hook 40a recovers from its deformation after passing the opening of the front wall 46, thereby preventing the eject button 40 from being discharged outside.

The numeral 48 denotes a support plate standing at the front part of the base plate 1 to support a circuit board 50 which is fitted in a groove 48a formed at an end portion of the support plate 48 and is screwed in a boss 49.

After the disc cassette 4 housing the floppy disc 5 therein has been charged into the disc carrier 2 under a condition shown in FIG. 3, the disc carrier 2 is rotated toward the surface of the base by the spring 10 and is set in its operative position shown in FIG. 2 for carrying out the recording and/or reproduction of the data onto the floppy disc 5.

When the recording and/or the reproduction of the data is finished, the eject button 40 is pushed inwardly against the force of the spring 47, is advanced to the rear wall 44 as being guided along the side walls 42, 43 and the guide rod 45, and its oblique part 41 engages the cross member 9, and the disc carrier 2 is rotated in the direction away from the base, so that the disc cassette 4 is discharged, and the disc carrier 2 is supported by the carrier support 16 in its charging/discharging position as shown in FIG. 3.

The present device is provided with the bezel 7 serving no function, that is, non-function type, and therefore the entire bezel may be omitted, or it may be attached as a mere ornamental plate. It is also convenient to apply the bezel to a personal computer or a word processor.

What is claimed is:

1. A floppy disc drive having a base plate defining a front end and a rear end, an elongated disc cassette carrier defining an open front end for receiving a disc cassette therein, and a rear end; the rear end of the disc cassette carrier being pivotally connected to the rear end of the base plate, means for moving the disc cassette carrier between an upper charging or discharging position in which the disc cassette may be inserted into or retrieved from the disc cassette carrier and a lower operative position in which a floppy disc contained in the disc cassette engages a drive element, said floppy disc drive comprising: a circuit board for electrically controlling a data recording or reproducing operation of the floppy disc drive; a plurality of support arms secured to the front and rear ends of the base plate to support said circuit board above said disc cassette carrier; said disc cassette moving means including an ejection button having a front part formed with laterally deformable abutment hooks and an attaching assembly mounted on said base plate at the front end thereof, said ejection button being pressed to move said disc cassette carrier from the lower operative position to the upper charging or discharging position; said attaching assembly including a stopper wall provided on the front end of said base plate and having an opening for receiving the front part of the ejection button, an end wall provided on said base plate in a spaced relation to said stopper wall, and side walls spaced from each other and extending transversely between said stopper wall and said end wall to guide a rear part of said ejection button; spring means provided between said ejection button and said end wall, said spring means normally pressing said abutment hooks on the ejection button against said stopper wall; and a non-functional bezel attached to the front end of said base plate, said bezel consisting of a flat frame defining an opening for receving said front part of the ejection button, and a slot for the disc cassette.

* * * * *